(12) United States Patent
Frolov et al.

(10) Patent No.: US 10,413,979 B2
(45) Date of Patent: Sep. 17, 2019

(54) TABLE SAW WITH CUTTING BLADE SAFETY FEATURE

(71) Applicants: Robert Bosch Tool Corporation, Broadview, IL (US); Robert Bosch GmbH, Stuttgart (DE)

(72) Inventors: Andrew Frolov, Glenview, IL (US); Gary L. Voong, Berwyn, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 372 days.

(21) Appl. No.: 15/230,035

(22) Filed: Aug. 5, 2016

(65) Prior Publication Data

US 2018/0036812 A1 Feb. 8, 2018

(51) Int. Cl.
| | |
|---|---|
| B23D 47/08 | (2006.01) |
| B27B 5/38 | (2006.01) |
| B27G 19/02 | (2006.01) |
| B23D 45/06 | (2006.01) |

(52) U.S. Cl.
CPC .......... *B23D 47/08* (2013.01); *B23D 45/067* (2013.01); *B27B 5/38* (2013.01); *B27G 19/02* (2013.01)

(58) Field of Classification Search
CPC ........ B23D 47/08; B23D 45/067; B27B 5/38; B27G 19/02
See application file for complete search history.

(56) References Cited

U.S. PATENT DOCUMENTS

| | | | |
|---|---|---|---|
| 9,140,333 B2* | 9/2015 | Gomez | ..................... F16H 3/32 |
| 2005/0139057 A1* | 6/2005 | Gass | .................... B23D 45/067 83/477.2 |
| 2011/0048194 A1 | 3/2011 | Groth et al. | |
| 2011/0061504 A1* | 3/2011 | Winkler | ............. B23Q 11/0092 83/58 |
| 2011/0099819 A1 | 5/2011 | Orlowski | |

FOREIGN PATENT DOCUMENTS

| | | |
|---|---|---|
| WO | 0126064 A2 | 4/2001 |
| WO | 03006213 A2 | 1/2003 |

OTHER PUBLICATIONS

International Search Report Corresponding to International Patent Application No. PCT/EP2017/069792 (6 pages).

* cited by examiner

*Primary Examiner* — Kenneth E Peterson
*Assistant Examiner* — Liang Dong
(74) *Attorney, Agent, or Firm* — Maginot Moore & Beck LLP (57) ABSTRACT

A power tool has a base defining a work surface, a rotary cutting blade extending through an opening in the work surface, a drive motor for imparting rotational movement to the cutting blade and a power train coupled between the drive motor and the cutting blade to transmit rotation movement from the drive motor to the cutting blade. A swing arm assembly carries the cutting blade and is pivotably supported on the base at a pivot axis.

In one aspect of the present disclosure, the power tool includes a safety system operable in response to an emergency signal that includes a mechanism for stopping the rotation of the cutting blade, whereby the rotational inertia of the cutting blade is converted after the rotation is stopped to pivoting of the swing arm assembly carrying the blade when the rotation of the blade is stopped.

19 Claims, 6 Drawing Sheets

TABLE SAW WITH CUTTING BLADE SAFETY FEATURE

FIELD

The present disclosure relates to power tools and more particularly to power tools with exposed cutting blades.

BACKGROUND

A number of power tools have been produced to facilitate forming a work piece into a desired shape. One such power tool is a table saw. A wide range of table saws are available for a variety of uses. Some table saws such a cabinet table saws are very heavy and relatively immobile. Other table saws, sometimes referred to as jobsite table saws, are relatively light. Jobsite table saws are thus portable so that a worker can position the table saw at a job site. Some accuracy is typically sacrificed in making a table saw sufficiently light to be mobile. The convenience of locating a table saw at a job site, however, makes job site table saws very desirable in applications such as general construction projects.

All table saws, including cabinet table saws and job site table saws, present a safety concern because the saw blade of the table saw is typically very sharp and moving at a high rate of speed. Accordingly, severe injury such as severed digits and deep lacerations can occur almost instantaneously. A number of different safety systems have been developed for table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, the blade guards can be removed by a user either for convenience of using the table saw or because the blade guard is not compatible for use with a particular shaping device. By way of example, a blade guard is typically not compatible with a dado blade and must typically be removed when performing non-through cuts.

Table saw safety systems have also been developed which are intended to stop the blade when a user's hand approaches or touches the blade. Various stopping devices have been developed including braking devices which are physically inserted into the teeth of the blade. Such approaches are extremely effective. Upon actuation of this type of braking device, however, the blade is typically ruined because of the braking member. Additionally, the braking member is typically destroyed. Accordingly, each time the safety device is actuated; significant resources must be expended to replace the blade and the braking member. Another shortcoming of this type of safety device is that the shaping device must be toothed. Moreover, if a spare blade and braking member are not on hand, a user must travel to a store to obtain replacements. Thus, while effective, this type of safety system can be expensive and inconvenient.

Some safety systems incorporating blade braking systems also move the blade below the surface of the table saw once the blade has been stopped. In this type of system, a latch is typically used to maintain the blade in position above the table saw surface until the braking system is activated. Once the blade has been moved to a location below the work piece support surface, movement of the blade must be stopped.

In view of the foregoing, it would be advantageous to provide a power tool with a safety system that does not damage the blade or other shaping device when stopping movement of the shaping device below the surface of a work piece support surface. A further advantage would be realized by a stopping mechanism that can be reused without requiring replacement of components.

SUMMARY

In accordance with one embodiment, a power tool comprises a base defining a work surface, a rotary cutting blade extending through an opening in the work surface, a drive motor for imparting rotational movement to the cutting blade and a power train coupled between the drive motor and the cutting blade to transmit rotation movement from the drive motor to the cutting blade. A swing arm assembly carries the cutting blade and is pivotably supported on the base at a pivot axis. A latch support the swing arm assembly in an operating condition in which the cutting blade extends through the opening in the work surface and is configured to be released to permit the swing arm assembly to pivot about the pivot axis to a safety position in which the cutting blade is beneath the work surface. In one aspect of the present disclosure, the power tool includes a safety system operable in response to an emergency signal that includes a mechanism for stopping the rotation of the cutting blade, whereby the rotational inertia of the cutting blade is converted after the rotation is stopped to pivoting of the swing arm assembly carrying the blade when the rotation of the blade is stopped.

BRIEF DESCRIPTION OF THE DRAWINGS

The accompanying drawings illustrate various embodiments of the present disclosure and together with a description serve to explain the principles of the disclosure.

Corresponding reference characters indicate corresponding parts throughout the several views. Like reference characters indicate like parts throughout the several views.

DETAIL DESCRIPTION

While the power tools described herein are susceptible to various modifications and alternative forms, specific embodiments thereof have been shown by way of example in the drawings and will herein be described in detail. It should be understood, however, that there is no intent to limit the power tools to the particular forms disclosed. On the contrary, the intention is to cover all combinations of features, modifications, equivalents, and alternatives falling within the spirit and scope of the present disclosure and the appended claims.

Figure 1:
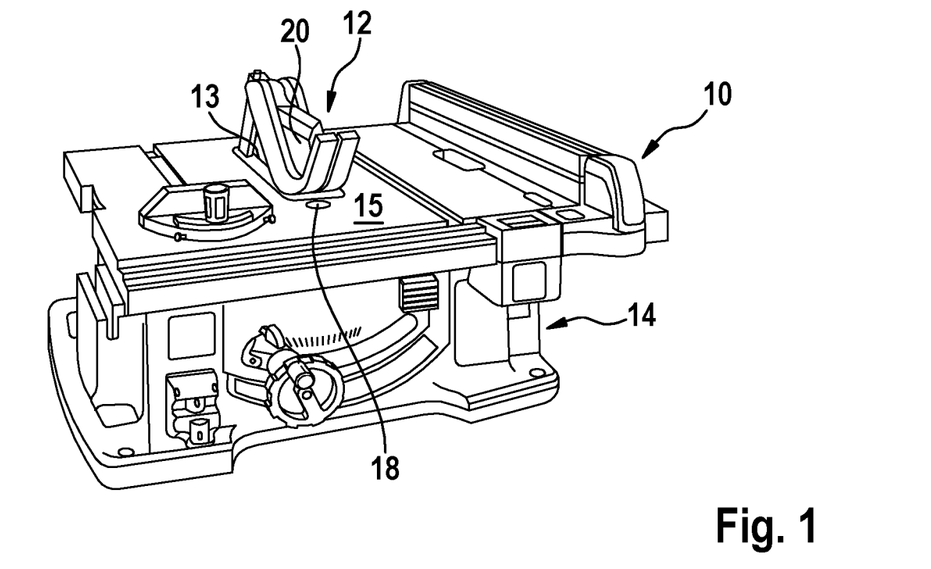
FIG. 1 is a top perspective view of a table saw incorporating a safety system in accordance with one aspect of the present disclosure.
Figure 2:
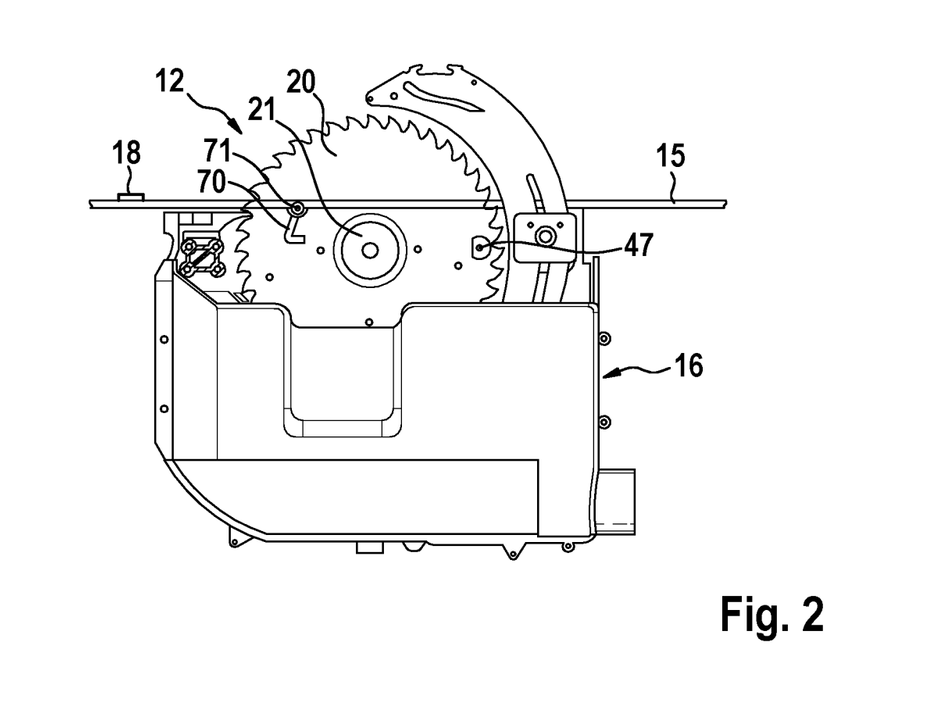
FIG. 2 is a side view of an undercarriage assembly for the table saw shown in FIG. 1.

A table saw 10 shown in FIG. 1 includes a blade assembly 12 mounted on a base 14 in manner so that the saw blade 20 extends through a slot defined in the work surface 15. As shown in FIG. 2, the blade assembly includes an undercarriage assembly 16 that supports the saw blade 20 beneath the work surface 15 and permits variable positions of the saw blade relative to the work surface, such as variable heights and angles.

Figure 3:
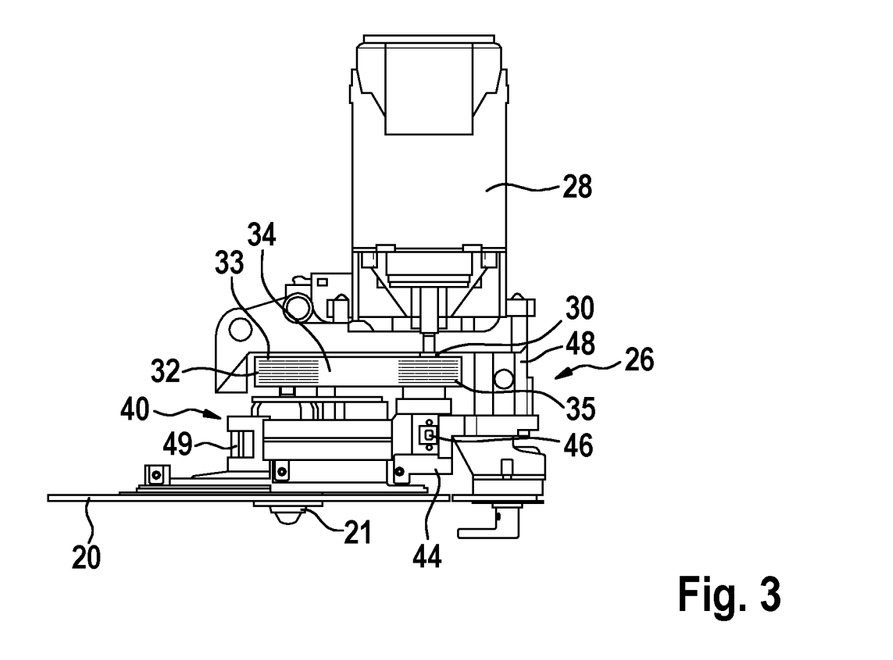
FIG. 3 is a top view of the cutting blade and power train of the table saw shown in FIG. 1.
Figure 4:
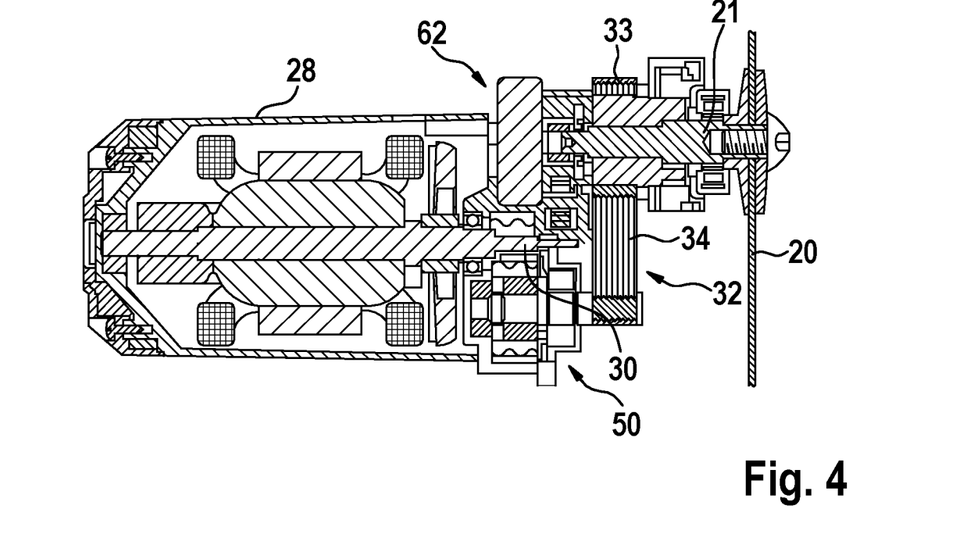
FIG. 4 is an end partial perspective cross-sectional view of the power train of the table saw shown in FIG. 1.

As shown in FIGS. 3 and 4, the power tool or table saw 10 is provided with a power train 26 that is coupled between the saw blade 20 and a drive motor 28. In one embodiment, the power train includes a pulley assembly 32 engaged between the output shaft 30 of the motor and the drive axle 21 of the saw blade 20. The pulley assembly 32 includes a driven pulley 33 engaged to the drive axle 21 and connected by a belt 34 to a drive pulley 35 engaged to the motor drive shaft 30. The pulley assembly 32 allows variation in the position of the driven pulley 33 and drive axle 21 of the saw blade 20 relative to the output shaft 30 of the drive motor 28. This variation permits the saw blade 20 to be retracted below the work surface 15 during a dangerous condition, such as when the operator's body is too near the moving saw blade.

Figure 6:
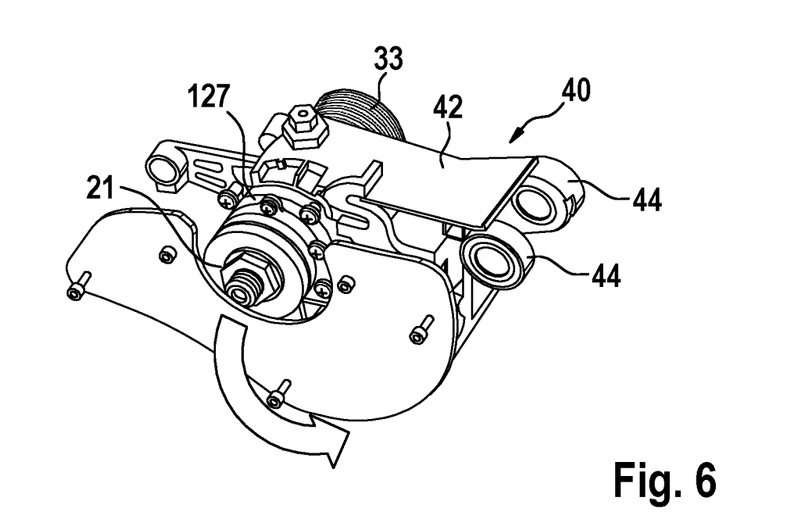
FIG. 6 is an enlarged perspective view of the swing arm assembly for the table saw shown in FIG. 1.

To accommodate this movement of the saw blade, in one aspect of the table saw 10, the blade assembly 12 is supported by a swing arm assembly 40, as shown in FIG. 6, mounted beneath the work surface. The swing arm assembly 40 includes a blade support 42 that supports the drive axle 21 to which the saw blade 20 is attached. The assembly includes a pivot yoke 44 that is pivotably supported at a pivot mount 46 on a support housing 48 of the power train 26. The pivot yoke 44 is thus pivotable about a pivot axis 47 (FIGS. 2 and 7) so that the blade 20 can pivot downward relative to the work surface 15. The swing arm assembly 40 may incorporate a latch bar 49 (FIG. 3) that can be engaged by a spring-biased latch 70 (FIG. 2). Alternatively, the spring-biased latch can be replaced by an electromagnet supported on the base that magnetically engages a ferrous plate at the location of the latch bar 49.

Figure 7:
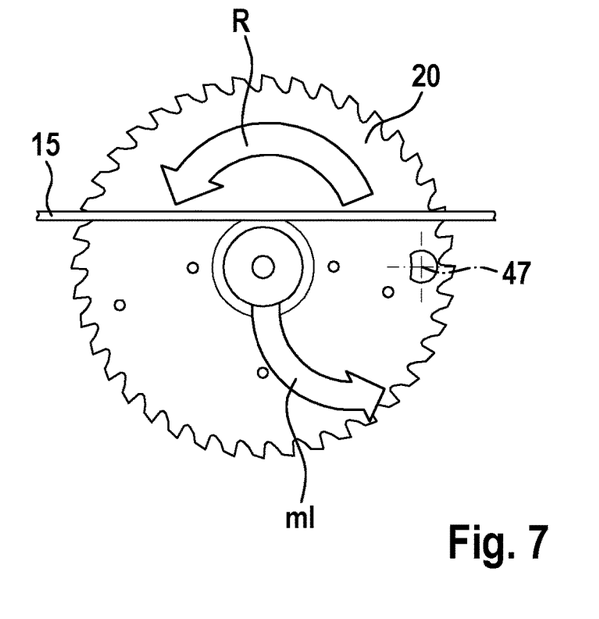
FIG. 7 is a side representation of the cutting blade of the table saw shown in FIG. 1 depicting inertial movement of the cutting blade.
Figure 8:
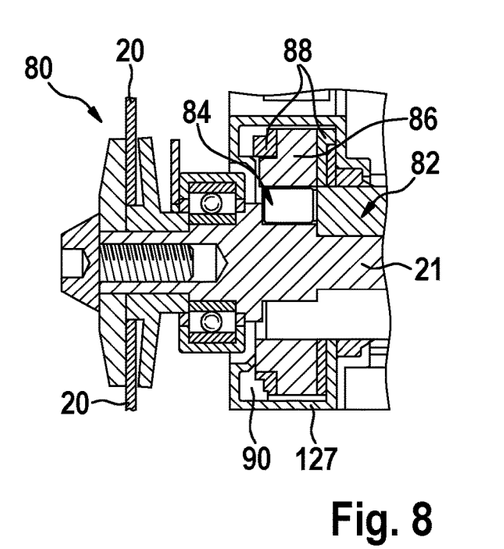
FIG. 8 is an enlarged cross-sectional view of an auto-locking feature of the second stage of the power train shown in FIG. 3.
Figure 9:
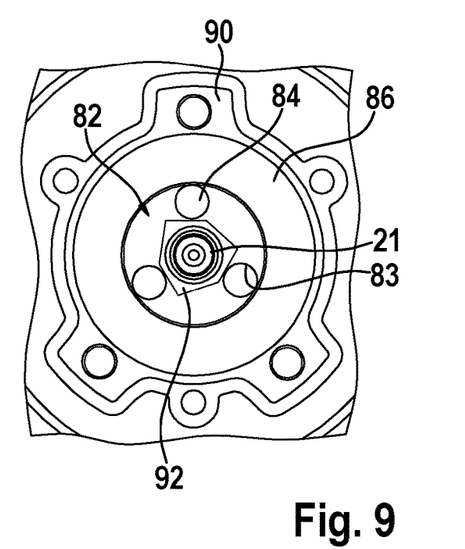
FIG. 9 is an enlarged plan view of the auto-locking hub of the feature shown in FIG. 8.

The undercarriage assembly 16, power train 26 and swing arm assembly 40 can be of several configurations provided that the saw blade 20 can be pivoted downward below the work surface. In prior safety systems an active mechanism releases the swing arm assembly in an emergency condition. In some systems the swing arm assembly is propelled downward, such as by ignition of a pyrotechnic feature. The safety system of the present disclosure contemplates using the rotational inertia of the saw blade itself to release the swing arm assembly from the latch 70 or other suitable mechanism holding the swing arm assembly in its working position. Thus, as illustrated in FIG. 7, the saw blade 20 rotates in the direction R when it is supported in the working position relative to the work surface 15. However, when the rotation of the saw blade is stopped rapidly the blade moment of inertia tries to pivot the entire blade assembly in the direction MI. It is this movement MI that disengages the swing arm assembly 40 from the latching mechanism that otherwise holds the assembly in the working position. When the latching mechanism 49/70 is disengaged by the moment of inertia MI the swing arm assembly and saw blade continue to pivot about the axis 47 until the saw blade 20 is disposed entirely beneath the work surface. The latching mechanism 49/70 is configured so that the inertial force generated by the blades movement MI is sufficient to immediately disengage the latching mechanism, but is configured to hold the swing arm assembly in the working position when the saw blade is rotating normally in the absence of an emergency condition. Thus, the latch 70 may incorporate a torsion spring 71 that is strong enough to hold the latch 70 in engagement with the latch bar 49 of the swing arm assembly during normal operation of the power tool. However, the torsion spring 71 is calibrated so that the inertial force produced by the blade movement MI flexes the torsion spring sufficiently to disengage the latch bar.

The safety system of the present disclosure thus relies on stopping the rotation of the saw blade on the occurrence of an emergency condition. This emergency condition can be due to the presence of the operator's body near the rotating saw blade, or even by the operator contacting the saw blade. This emergency condition can be sensed by one or more sensors 18 (FIGS. 1-2) associated with the work surface 15 and/or saw blade assembly 12. Various sensors are known that can provide a signal based on the proximity of the operator's body, contact between the operator's body and the saw blade or some other emergency condition requiring immediate stoppage of the saw blade and removal from the blade from its working position. The sensors 18 may thus be optical, magnetic, capacitive, thermal or other forms of sensor capable of rapidly sensing the proximity of the operator's body and generating a usable signal. The sensors 18 provide a signal to a controller 62 for controlling one or more actuators, such as electromagnets, in the safety system of the present disclosure, as described in more detail herein. The controller 62 includes control circuitry for energizing the one or more electromagnets as well as a power source. The power source may be derived from the power supply to the table saw 10 or may be integrated into the controller, such as by a battery or capacitor array able to store sufficient voltage to activate the electromagnets on demand.

Figure 5:
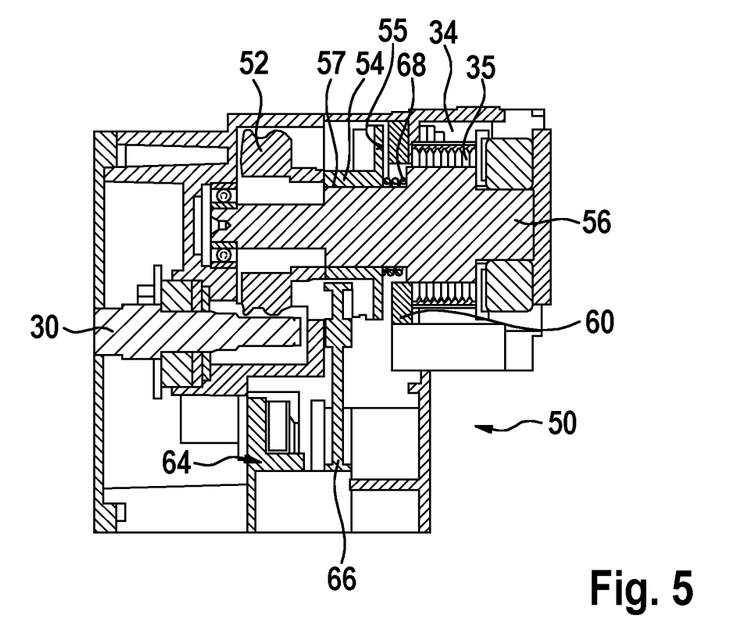
FIG. 5 is an enlarged cross-sectional view of a first stage of the power train shown in FIG. 4.

One of the components of the safety system disclosed herein is incorporated into a first stage 50 of the power train, as shown in detail in FIG. 5. The first stage 50 includes a spur gear 52 that is driven by the motor output shaft 30. The spur gear is in meshed engagement with a face gear 54 to transmit rotation from the motor output shaft. The face gear is meshed with a first stage shaft 56, such as by a splined interface 57. The splined interface 57 allows the face gear 54 to slide along the length of the first stage shaft 56, toward and away from the spur gear 52. The first stage shaft 56 is coupled to a drive pulley 35 that drives the belt 34. As described above, the belt 34 is coupled to the driven pulley 33 to transmit rotation and torque to the drive axle 21 of the saw blade 20.

The power train first stage 50 includes an actuator 64 that may be an electromagnet that is connected to the controller 62. The electromagnet 64 is coupled to a clutch assembly 66 that engages the face gear 54 so that the face gear is held in the operating position in engagement with the spur gear, as shown in FIG. 5, based on a first energization state of the electromagnet. A spring 68 may be disposed between the face gear reaction surface 55 and the drive pulley 35 (or a hub of the first stage shaft 56 on which the pullet is mounted) to push the face gear 54 into engagement with the spur gear 52. When the electromagnet 64 is placed in a second energization state, the clutch assembly 66 pushes the face gear 54 away from the spur gear 52 so that the two gears are disengaged, thereby isolating the first stage shaft 56 from rotation. At the same time, the clutch assembly 66 pushes the reaction surface 55 of the face gear 54 against a friction pad 60. This pressure from the face gear 54 on the friction pad 60 starts to slow down the rotation of the drive pulley 35, which reduces the speed of the belt 34, driven pullet 33, and ultimately the drive axle 21 of the saw blade 20. The friction pad 60 may be anchored to a housing of the first stage and may be configured to contact the drive pulley 35 when pushed by the face gear to exert a friction force on both the face gear and the drive pulley.

The electromagnet 64 and clutch assembly 66 may be configured to provide sufficient pressure on the friction pad 60 to stop the rotation of the pulley assembly 32. However, for the purposes of the present safety system it is not necessary for this friction engagement to fully stop the rotation of the drive axle 21 due to the components of the power train second stage 80 described herein. It can be appreciated that the power train first stage 50 is configured to transmit rotation from the motor output shaft 30 to the pulley assembly 32 in the normal operating condition. In this condition the electromagnet is maintained in the first energization state, in which the electromagnet is deactivated. When an emergency condition is sensed by the sensors 18 and an emergency signal is received by the controller 62, the controller 62 immediately moves the electromagnet 64 to its second energization state, in which the electromagnet is activated to move the clutch assembly to disengage the face gear. It can be appreciated that the electromagnet 64 may be constructed to hold the face gear 54 in the operating position in the first energization state of the electromagnet without the need for the spring 68, and then to switch in the second energization state to disengage the spur gear and face gear.

Figure 10:
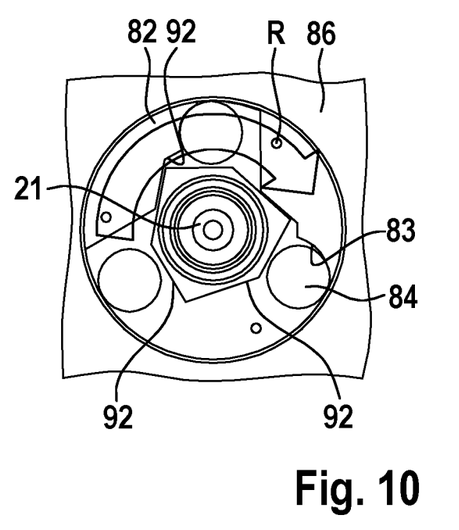
FIG. 10 is a representation of the auto-locking hub of FIG. 9 shown in its un-locked position.

The power train 26 includes a second stage 80 shown in FIGS. 8-15 that provides the second feature of the safety system that utilizes the reduction in rotational speed of the pulley assembly 32 and saw blade drive axle 21 caused by the electromagnet and clutch assembly of the power train first stage. In particular, the power train second stage 80 incorporates an auto-locking hub 82 mounted onto the drive axle 21 of the saw blade 20. As shown particularly in FIGS. 8-9, the auto-locking hub 82 includes a plurality of rollers 84 (three in the illustrated embodiment) that are disposed within roller pockets 83 formed in the hub 82. A jam ring 86 encircles the hub 83, in which the jam ring 86 is flanked by friction pads 88 anchored by an anchor plate 90 to the second stage housing 127 (which can be part of the support 42 of the swing arm assembly 40). The jam ring 86 can be held rotationally fixed by frictional engagement with the friction pads relative to the drive axle 21 which is free to rotate in the normal operating condition of the table saw. As shown in FIG. 10, in the normal operating condition the rollers 84 are all seated within a respective pocket 83 in the auto-locking hub 82 and bear against the contact surfaces 92 associated with the drive axle 21 so that the drive axle 21 and auto-locking hub 82 can freely rotate relative to the jam ring 86. The auto-locking hub 82 is integrated into the driven pulley 33 of the pulley assembly 32 so that in the position shown in FIG. 10, rotation of the driven pulley 33 (due to rotation of the drive motor 28) rotates the auto-locking hub 82, which rotates the drive axle 21.

Figure 11:
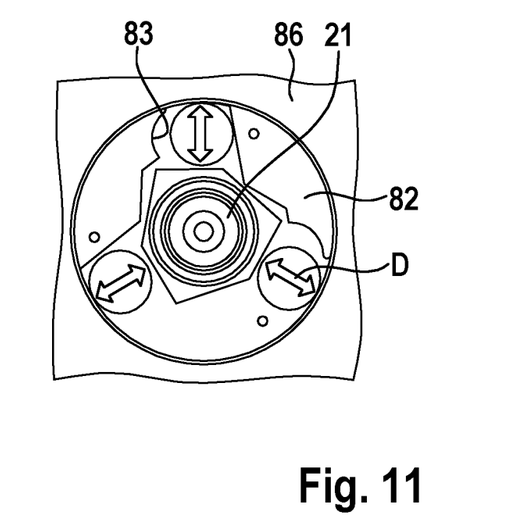
FIG. 11 is a representation of the auto-locking hub of FIG. 9 shown in its locked position.

However, when there is a change in the relative rotation between the auto-locking hub 82 and the drive axle 21 (and its contact surfaces 92) the rollers 84 shift to a position in which the rollers are jammed between the contact surfaces 92 and the jam ring 86 thereby fixing the rotation of the drive axle 21 and the auto-locking hub 82 to the jam ring 86, as depicted in FIG. 11. Since the jam ring 86 frictionally engaged the friction pads 88, the rotation of the hub 82 and drive axle 21 is stopped nearly immediately due to the friction between the pads 88 and the jam ring. It is noted that the rotation of the hub and drive axle is preferably not immediate in order to avoid damage to the cutting blade due to rapid deceleration of the blade. When the rotation of the saw blade 20 is stopped suddenly, the rotational inertia causes the blade 21 and swing arm assembly 40 to pivot about the axis 47 in the direction MI as depicted in FIG. 7. This movement disengages the swing arm assembly 40 from the latch element 70 so that the swing arm assembly, and thus the cutting blade 20, rotate harmlessly below the work surface 15 of the table saw base 14.

As described above, the change in relative rotation between the saw blade drive axle 21 and the auto-locking hub 82 is accomplished in the power train first stage 50 when the drive pulley 35 is disengaged from the drive motor. The friction pads 60 further slow the rotation of the drive pulley, which ultimately slows the rotation of the auto-locking hub 82 coupled to the driven pulley 33. The inertia of the rotating saw blade 20 causes the blade to attempt maintain its rotational speed even while the rotational speed of the hub 82 is being reduced. This change in relative rotational speed is what shifts the position of the rollers 84 from the normal operating condition shown in FIG. 10 to the immediately stopping condition shown in FIG. 11. In this state of the auto-locking hub the blade rotation is effectively stopped immediately and the resulting moment of inertia MI causes the entire swing arm assembly and saw blade to pivot away from the dangerous condition that precipitated this event.

Figure 12:
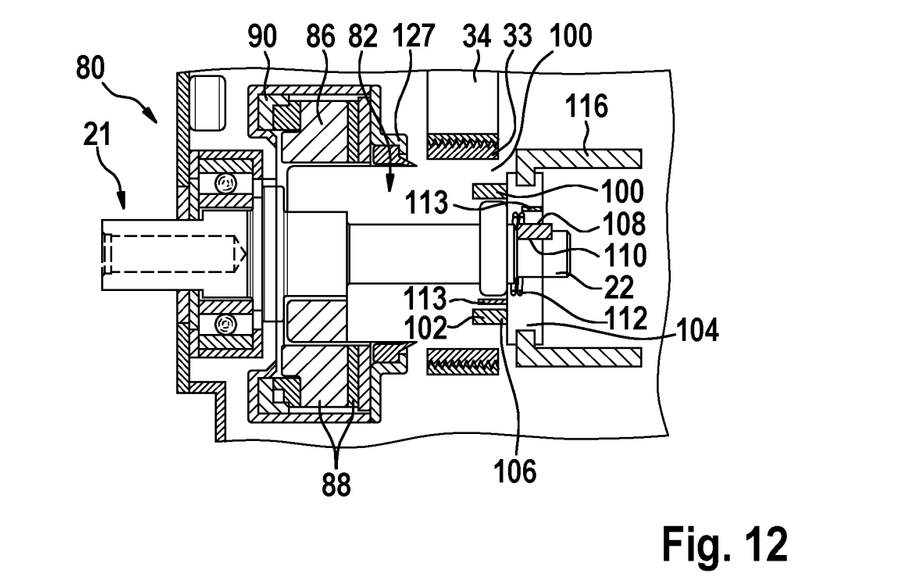
FIG. 12 is a side cross-sectional view of the second stage of the power train shown in FIG. 3.
Figure 13:
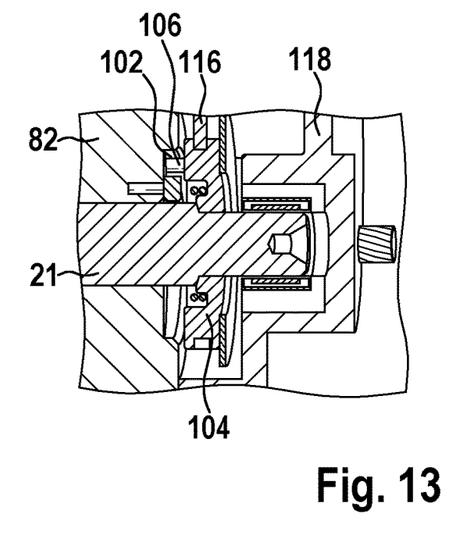
FIG. 13 is an enlarged cross-sectional view of another feature of the auto-locking hub shown in FIG. 12 shown with the feature engaged for rotation.
Figure 14:
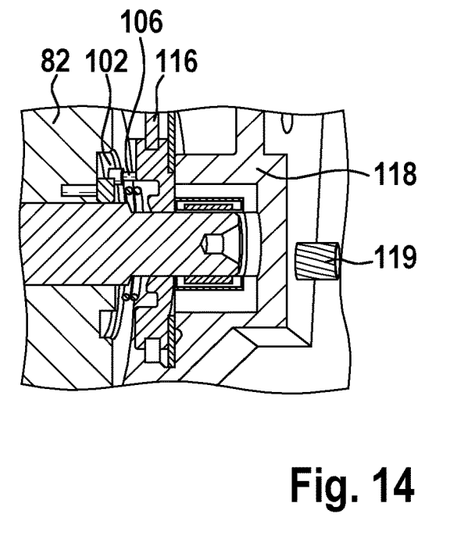
FIG. 14 is an enlarged cross-sectional view of another feature of the auto-locking hub shown in FIG. 12 shown with the feature disengaged.

It can be appreciated that even during normal operation of the power saw, and in the absence of an emergency condition, that the rotational speed of the saw blade 20 relative to the hub 82 may vary, such as when the power tool is being shut down. Even during normal operation there will be variations in blade speed that might otherwise be sufficient to activate the automatic stopping features of the auto-locking hub 82. Thus, the power train second stage 80 includes a further feature to maintain the angular alignment between the auto-locking hub 82 and the drive axle 21 during normal operation and normal stopping and starting of the power saw 10. As shown in FIGS. 12-14, the rear face 100 of the auto-locking hub is provided with axially extending pin cavities 102. A rear hub 104 is mounted on the rear end 22 of the drive axle 21 and is rotationally fixed by an anti-rotation key 108 situated within a key slot 110 in the rear end 22. The rear hub 104 can slide axially but is fixed to rotate with the drive axle 21. The rear hub 104 includes pins 106 projecting from the hub into the pin cavities 102, as shown in FIGS. 12 and 13. When the pins 106 are disposed within the cavities 102 the auto-locking hub 82 and the drive axle 21 are essentially fixed in rotation and rotational orientation. This position ensures that the rollers 84 in the auto-locking hub 82 are maintained in the mutual rotation unlocked position that permits free rotation of the drive axle.

However, when the pins 106 are dislodged from the cavities 102 this fixed rotational relationship is disrupted. So long as the relative rotational speeds between the hub 82 and drive axle 21 are within the operating range the two components will continue to rotate together, as illustrated in FIG. 10. However, when the relative speeds change due to an emergency condition it is necessary to lock the rotation of the drive axle 21, which requires relative angular displacement between the hub 82 and the drive axle 21 as discussed above. Thus, it is in this condition that the pins 106 must be dislodged from the cavities 102. In order to accomplish this movement, an actuator 118 is provided that may be an electromagnet connected 119 to the electromagnet controller 62. The actuator is operable to move the rear hub axially relative to the end face 100 of the auto-lock hub, and can include a plate 116 that can be attracted by the electromagnet 118. In the normal operating condition shown in FIG. 13, the electromagnet 118 is in a first energization state, or de-energized, so that the pins 106 are disposed within the cavities 102. However, when an emergency condition is sensed by sensors 18, the controller 62 places the electromagnet 118 in a second energization state, or energizes the electromagnet, to attract the plate 116, thereby moving the rear hub 104 away from the auto-locking hub rear face 100. This movement dislodges the pins 106 from the cavities which allows the hub 82 and saw blade 20/drive axle 21 to be angularly misaligned as needed to activate the auto-locking feature of the system.

Figure 15:
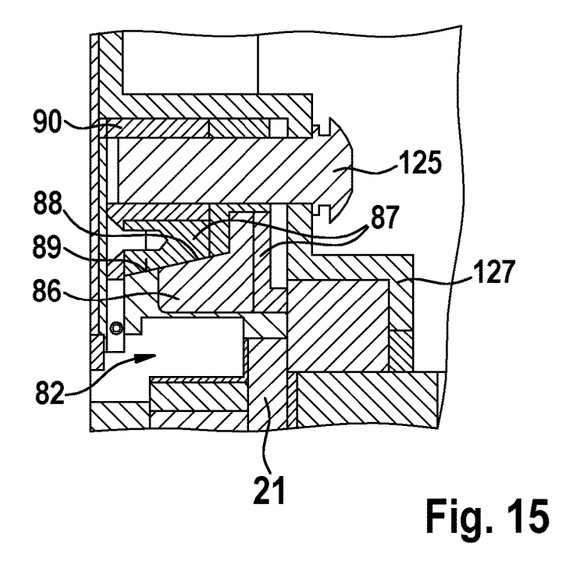
FIG. 15 is an enlarged cross-sectional view of an adjustment component of the first stage of the auto-locking component depicted in FIG. 8.

The present system provides means to adjust the emergency stop conditions. In particular, as illustrated in FIG. 15, an adjustment screw 125 extends through the housing 127 and into engagement with a threaded bore in the anchor plate 90 to which the friction pads 88 are affixed. One of the friction pads includes a slightly angled surface 89 that contacts a correspondingly angled surface 87 on the jam ring 86. The position of the friction pads 88 can be adjusted by rotation of the screw 125 to adjust the frictional engagement with the jam ring 82. Adjusting this frictional interface adjusts deceleration of the cutting blade or the amount of time required to stop the rotation of the saw blade once the auto-locking hub is engaged in its locked position.

The safety system disclosed herein allows for the saw blade to be stopped immediately and retracted below the work surface and away from the emergency condition. The safety system further performs this safety function without damaging the saw blade or the power train. moreover, the present safety system allows the operating components to be restored to their operating position very quickly and without the need to replace any components. In particular, to reset the operating components it is only necessary to pivot the swing arm assembly 40 upward until the latch bar 49 engages the latch 70. In an alternative embodiment the latch 70 may be an electromagnet that is deactivated by the controller 62 when an emergency condition is sensed but re-activated when the normal operating mode is resumed.

In the power train first stage, the springs 60 will push the face gear 54 back into engagement with the spur gear 51, restoring rotational transmission from the motor output shaft 30 to the drive pulley 35 of the pulley assembly 32. The auto-locking hub 82 can be restored to its normal position by rotating the drive axle 21 of the saw blade. The rear hub 104 can be reengaged with the auto-locking hub 82 by rotating the rear hub against a torsion spring 112 engaged by spring anchors 113 (FIG. 12) between the two hubs. The rear hub can be rotated until the pins 106 align with the cavities 102 in the auto-locking hub 82. The controller 62 can restore the electromagnets 64 and 118 to their normal operating energization state.

While the invention has been illustrated and described in detail in the drawings and foregoing description, the same should be considered as illustrative and not restrictive in character. It is understood that only certain embodiments have been presented and that all changes, modifications and further applications that come within the spirit of the present disclosure are desired to be protected.

For example, the illustrated embodiments incorporate electromagnets 64 and 118 as actuators for moving the clutch assembly 66 and rear hub 104, respectively. Other actuators may be implemented that can be activated quickly in response to a signal from the sensors 18 or the controller 62. The actuators must be capable of very rapid activation in order to preserve the safety aspect of the safety systems disclosed herein.

Furthermore, the power train 26 of the disclosed embodiments includes a pulley assembly 32 with a drive pulley 35, a driven pulley 33 and a belt 34 rotationally coupling the two pulleys. The pulley assembly 32 allows the drive axle 21 of the rotary saw blade 20 to remain rotationally connected to the drive motor 28 even as the swing arm assembly 40 carrying the blade is pivoted downward in an emergency event. However, other power trains are contemplated that can provide rotational speed and torque transmission from the motor 28 to the drive axle 21 of the saw blade 20 and that can accommodate the pivoting movement of the drive axle accomplished by the safety systems disclosed herein.

What is claimed is:

1. A power tool comprising:
   a base defining a work surface;
   a rotary cutting blade extending through an opening in the work surface, said cutting blade including a drive axle;
   a drive motor for imparting rotational movement to the cutting blade;
   a power train coupled between the drive motor and the drive axle of the cutting blade to transmit rotational movement from the drive motor to the cutting blade;
   a swing arm assembly pivotably supported on the base at a pivot axis, the swing arm assembly carrying the cutting blade and including a latch configured to support the swing arm assembly in an operating condition in which the cutting blade extends through the opening in the work surface and configured to be released to permit the swing arm assembly to pivot about the pivot axis to a safety position in which the cutting blade is beneath the work surface; and
   a safety system operable in response to an emergency signal and including a mechanism for stopping the rotation of the cutting blade, whereby the rotational inertia of the cutting blade is converted after the rotation is stopped to pivoting of the swing arm assembly carrying the blade when the rotation of the blade is stopped, wherein the mechanism for stopping rotation of the blade includes;
      an auto-locking hub mounted on said drive axle and rotationally coupled to the power train;
      a jam ring surrounding said auto-locking hub and rotationally fixed in relation to said drive axle and said auto-locking hub; and
      a plurality of rollers disposed between said auto-locking hub, said drive axle and said jam ring,
      wherein said auto-locking hub, jam ring and rollers are configured to transmit rotation between said auto-locking hub and said drive axle in a first operating position and to lock the drive axle to the jam ring in a locking position upon a change in relative rotational speed between the auto-locking hub and said drive axle, whereby the rotation of said cutting blade is stopped in said locking position.

2. The power tool of claim 1, further comprising at least one sensor operable to sense an emergency condition associated with the cutting blade and to generate an emergency signal in response thereto.

3. The power tool of claim 1, wherein the latch is configured to be released by the rotational inertia of the cutting blade.

4. The power tool of claim 1, wherein:
the power train includes;
a pulley assembly between the drive motor and a drive axle supporting the rotary cutting blade, the pulley assembly including a drive pulley rotationally coupled to the drive motor and a driven pulley rotationally coupled to the drive axle; and
a first stage between the drive motor and the drive pulley, the first stage including;
a first gear rotationally coupled to the drive motor;
a first stage shaft rotationally coupled to the drive pulley; and
a second gear in slidable splined engagement with the first stage shaft for transmission of rotation therebetween, and a disengageable engagement with the first gear for selective transmission of rotation therebetween; and
the safety system includes a clutch arrangement for moving said second gear out of engagement with said first gear.

5. The power tool of claim 4, wherein the safety system further includes a friction pad and the clutch arrangement is configured to move said second gear into friction engagement with said friction pad as or after the second gear has disengaged with said first gear.

6. The power tool of claim 4, wherein the auto-locking hub is rotationally coupled to said driven pulley of said pulley apparatus.

7. The power tool of claim 1, wherein said mechanism includes a friction pad fixed to said swing arm assembly and frictionally engaged to said jam ring.

8. The power tool of claim 7, wherein the frictional engagement between said friction pad and said jam ring is adjustable to adjust the deceleration of the cutting blade.

9. The power tool of claim 1, wherein the safety mechanism further includes:
a rear hub slidably mounted on said drive axle adjacent an axial end face of said auto-lock hub;
a sliding rotational engagement between said rear hub and said drive axle; and
a plurality of pins projecting from said rear hub toward said auto-lock hub for selective engagement within corresponding cavities defined in said axial end face of said auto-lock hub.

10. The power tool of claim 9, wherein the safety mechanism further includes a hub actuator operable in response to said emergency signal to move said rear hub away from said auto-lock hub to disengage said plurality of pins from said corresponding cavities to permit angular movement of said auto-lock hub relative to said drive axle of said cutting blade.

11. The power tool of claim 10, wherein said hub actuator includes an electromagnet.

12. The power tool of claim 1, wherein said clutch arrangement includes a clutch actuator operable in response to said emergency signal to actuate a clutch plate arranged to move said second gear out of engagement with said first gear.

13. The power tool of claim 12, wherein said clutch actuator includes an electromagnet.

14. A cutting blade assembly for a power tool having a base defining a work surface, a drive motor supported by the base and operable to impart rotational motion and a power train coupled to the drive motor to transmit rotation movement from the drive motor, the cutting blade assembly comprising:
a rotary cutting blade including a drive axle couplable to the power train for rotation;
a swing arm assembly carrying the cutting blade having a pivot yoke for pivotably mounting to the base at a pivot axis and including a latch configured to support the swing arm assembly in an operating condition in which the cutting blade extends through an opening in the work surface, the latch further configured to be released to permit the swing arm assembly to pivot about the pivot axis to a safety position in which the cutting blade is beneath the work surface; and
a safety system operable in response to an emergency signal and including a mechanism for stopping the rotation of the cutting blade, whereby the rotational inertia of the cutting blade is converted after the rotation is stopped to pivoting of the swing arm assembly carrying the blade when the rotation of the blade is stopped, wherein the mechanism for stopping rotation of the blade includes;
an auto-locking hub mounted on said drive axle and rotationally couplable to the power train;
a jam ring surrounding said auto-locking hub and rotationally fixed in relation to said drive axle and said auto-locking hub; and
a plurality of rollers disposed between said auto-locking hub, said drive axle and said jam ring,
wherein said auto-locking hub, jam ring and rollers are configured to transmit rotation between said auto-locking hub and said drive axle in a first operating position and to lock the drive axle to the jam ring in a locking position upon a change in relative rotational speed between the auto-locking hub and said drive axle, whereby the rotation of said cutting blade is stopped in said locking position.

15. The cutting blade assembly of claim 14, wherein said mechanism includes a friction pad fixed to said swing arm assembly and frictionally engaged to said jam ring.

16. The cutting blade assembly of claim 15, wherein the frictional engagement between said friction pad and said jam ring is adjustable to adjust the deceleration of the cutting blade.

17. The cutting blade assembly of claim 14, wherein the safety mechanism further includes:
a rear hub slidably mounted on said drive axle adjacent an axial end face of said auto-lock hub;
a sliding rotational engagement between said rear hub and said drive axle; and
a plurality of pins projecting from said rear hub toward said auto-lock hub for selective engagement within corresponding cavities defined in said axial end face of said auto-lock hub.

18. The cutting blade assembly of claim 17, wherein the safety mechanism further includes a hub actuator operable in response to said emergency signal to move said rear hub away from said auto-lock hub to disengage said plurality of pins from said corresponding cavities to permit angular movement of said auto-lock hub relative to said drive axle of said cutting blade.

19. The cutting blade assembly of claim 18, wherein said hub actuator includes an electromagnet.

\* \* \* \* \*